US008952663B2

(12) United States Patent
Okuda et al.

(10) Patent No.: US 8,952,663 B2
(45) Date of Patent: Feb. 10, 2015

(54) BATTERY CHARGE AND DISCHARGE CONTROL APPARATUS AND METHOD FOR CONTROLLING BATTERY CHARGE AND DISCHARGE

(75) Inventors: Yasuo Okuda, Moriguchi (JP); Toshiya Iwasaki, Moriguchi (JP); Souichi Sakai, Moriguchi (JP); Hirotsugu Murashima, Moriguchi (JP)

(73) Assignee: Sanyo Electric Co., Ltd. (JP)

( * ) Notice: Subject to any disclaimer, the term of this patent is extended or adjusted under 35 U.S.C. 154(b) by 507 days.

(21) Appl. No.: 13/423,502

(22) Filed: Mar. 19, 2012

(65) Prior Publication Data

US 2012/0176094 A1    Jul. 12, 2012

Related U.S. Application Data

(63) Continuation of application No. PCT/JP2011/069987, filed on Sep. 2, 2011.

(30) Foreign Application Priority Data

Sep. 30, 2010    (JP) .................. 2010-220968

(51) Int. Cl.
  *H02J 7/00*    (2006.01)
  *H01M 10/44*    (2006.01)
  *H01M 10/48*    (2006.01)

(52) U.S. Cl.
  CPC .......... *H01M 10/441* (2013.01); *H01M 10/482* (2013.01); *H02J 7/0026* (2013.01)
  USPC ............................ 320/134; 320/149; 320/155

(58) Field of Classification Search
  CPC .................................................... H02J 7/0031
  USPC ............................................................ 320/134
  See application file for complete search history.

(56) References Cited

U.S. PATENT DOCUMENTS 6,060,864 A  *  5/2000  Ito et al. ........................ 320/136
6,377,028 B1 *  4/2002  Armstrong et al. ........... 320/136
(Continued)

FOREIGN PATENT DOCUMENTS

JP      10-123225 A     5/1998
JP      2006-140094 A   6/2006
(Continued)

OTHER PUBLICATIONS

International Preliminary Report on Patentability with Written Opinion for International Application No. PCT/JP2011/069987; Date of Mailing Apr. 18, 2013, with English Translation.

*Primary Examiner* — Yalkew Fantu
(74) *Attorney, Agent, or Firm* — Cantor Colburn LLP

(57) ABSTRACT

A master controller of a battery charge and discharge control apparatus is a device performing charge and discharge control on a group of a predetermined number of battery arrays, the battery arrays being connected together in parallel. The master controller acquires an entire charge or discharge instruction intended for the entire battery array group, starts charging or discharging each of the battery arrays at a uniform charge or discharge power value, acquires a charge or discharge status of each of the battery arrays after the beginning of the charge or discharge and compares the charge or discharge status with a predetermined charge or discharge set value for the entire battery array group, and changes the charge or discharge power value of each of the battery arrays based on a result of the comparison.

10 Claims, 7 Drawing Sheets

(56) References Cited

U.S. PATENT DOCUMENTS

| | | |
|---|---|---|
| 8,089,177 B2 | 1/2012 | Kato |
| 2003/0117112 A1* | 6/2003 | Chen et al. .................... 320/137 |
| 2005/0035741 A1* | 2/2005 | Elder et al. .................... 320/116 |
| 2010/0097033 A1* | 4/2010 | Tange ........................... 320/116 |

FOREIGN PATENT DOCUMENTS

| | | |
|---|---|---|
| JP | 2007-290845 A | 11/2007 |
| JP | 2008-226511 A | 9/2008 |
| JP | 2009-261183 A | 11/2009 |

* cited by examiner

BATTERY CHARGE AND DISCHARGE CONTROL APPARATUS AND METHOD FOR CONTROLLING BATTERY CHARGE AND DISCHARGE

CROSS REFERENCE TO RELATED APPLICATION

The present application is a continuation application of International Application No. PCT/JP2011/069987, filed Sep. 2, 2011, the entire contents of which are incorporated herein by reference and priority to which is hereby claimed. The PCT/JP2011/069987 application claimed the benefit of the date of the earlier filed Japanese Patent Application No. 2010-220968, filed Sep. 30, 2010, the entire contents of which are incorporated herein by reference, and priority to which is hereby claimed.

TECHNICAL FIELD

The present invention relates to a battery charge and discharge control apparatus and to a method for controlling battery charge and discharge.

BACKGROUND ART

In power management, power generation and transmission are preferably efficiently carried out according to the power consumption of a load. If the power consumption of the load fluctuates, peak power may be excessive, increasing an electric utility rate. Furthermore, power supply may not cover the peak power. Power storage apparatuses may be used to average the power demand. Secondary batteries such as lithium ion batteries may be used as power storage apparatuses.

Patent Literature 1 discloses that a management apparatus for lithium ion batteries determines the status of charge and discharge of lithium ion batteries based on the measured values of a charge current to and a discharge current from the lithium ion batteries, the measured value of temperature, and information on power supply from a commercial power source, and calculates the state of charge corresponding to the remaining capacity of the lithium ion batteries.

CITATION LIST

Patent Literature: JP 2006-140094 A

SUMMARY OF THE INVENTION

Technical Problem

The power storage apparatus is known to have the characteristics thereof degraded when subjected to overcharge or overdischarge. Thus, when the power storage apparatus is charged or discharged, charge and discharge control is performed with the SOC (State of Charge) monitored, which is indicative of the degree of charge, so as to prevent possible overcharge or overdischarge. For example, when a plurality of arrays of power storage apparatuses are connected together in parallel to form a single power storage system, the battery arrays may vary in the degree of charge. In such a case, the charge and discharge control needs to be appropriately preformed so as to prevent each of the battery arrays from being subjected to overcharge, overdischarge, or the like.

An object of the present invention is to provide a battery charge and discharge control apparatus and a method for controlling battery charge and discharge which are designed to appropriately charge and discharge a plurality of battery arrays.

Solution to Problem

The present invention provides a charge and discharge control apparatus that performs charge and discharge control on a group of a predetermined number of battery arrays into which a battery assembly that is an assembly of a plurality of batteries is divided, the battery arrays being connected together in parallel, the apparatus comprising an instruction acquisition section acquiring an entire charge or discharge instruction intended for the entire battery array group, a start processing section starting charging or discharging of each of the battery arrays at a uniform charge or discharge power value obtained by dividing an entire charge or discharge power value contained in the acquired entire charge or discharge instruction by a number of the battery arrays, a comparison section acquiring a charge or discharge status of each of the battery arrays after the beginning of the charge or discharge and comparing the charge or discharge status with a predetermined charge or discharge set value for the entire battery array group, and a change process section changing the charge or discharge power value of each of the battery arrays based on a result of the comparison.

Advantageous Effects of Invention

The present invention allows a plurality of battery arrays to be appropriately charged and discharged.

DESCRIPTION OF EMBODIMENT

Figure 1:
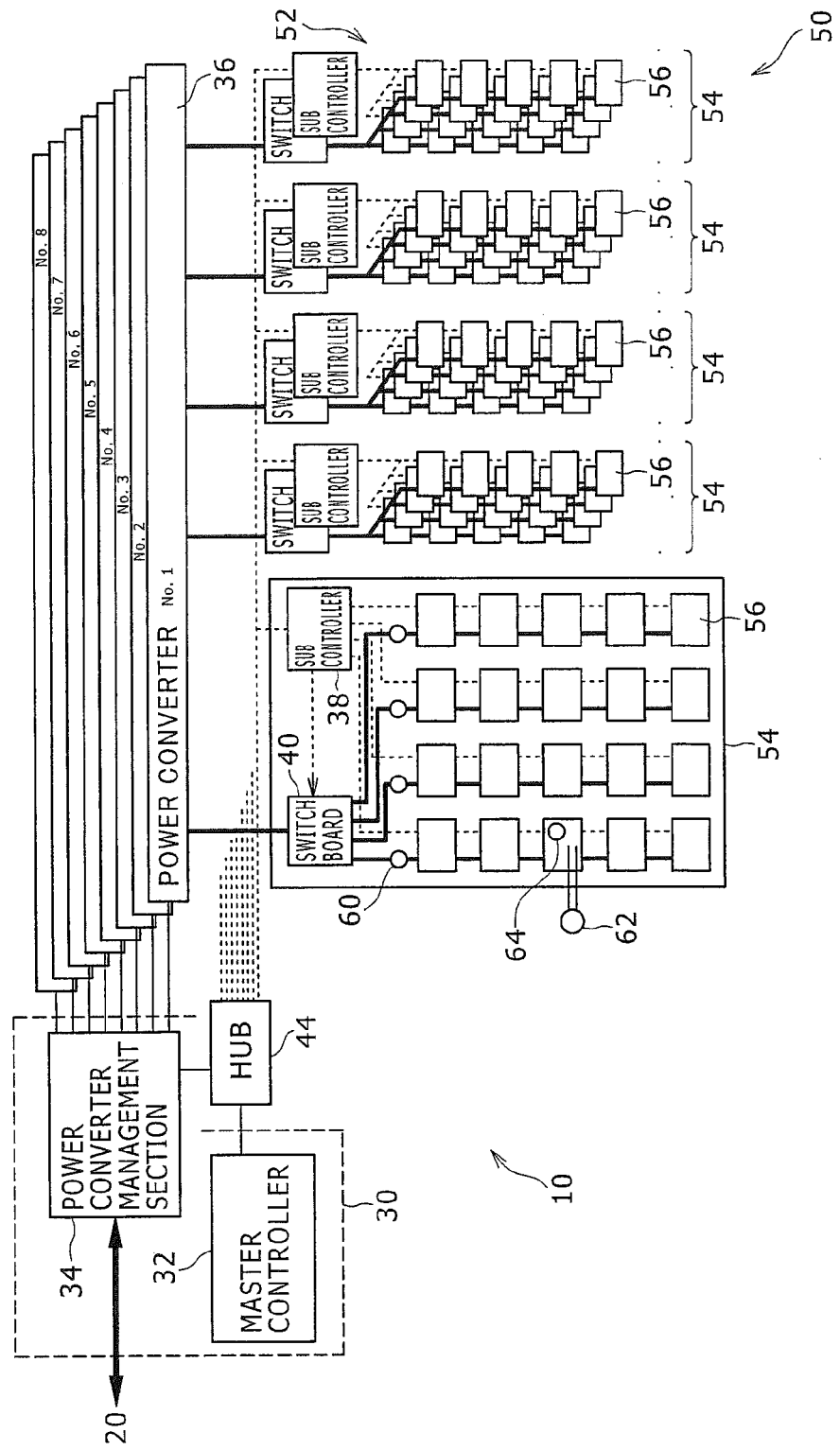
FIG. 1 is a diagram illustrating a plurality of battery arrays to undergo charge and discharge control according to an embodiment of the present invention.

An embodiment according to the present invention will be described below with reference to the drawings. In the description below, batteries are lithium ion batteries. However, other secondary batteries may be used. For example, nickel-hydrogen batteries or nickel-cadmium batteries may be used. A battery assembly is used in order to obtain a voltage and a current sufficient to provide power required for a load. Thus, the following may be used according to specifications for a battery charge and discharge control system: an appropriate number of unit batteries included in the battery assembly, an appropriate number of battery packs corresponding to combinations of unit batteries, an appropriate number of battery units corresponding to combinations of battery packs, and the like. Furthermore, the battery assembly may be divided into other classes or hierarchy. Additionally, in the following description, the battery assembly is divided into eight battery arrays. However, this is an illustration for description, and another number of arrays may be used. In addition, charge power values discussed below are illustrations for description, and of course other power values may be used.

Furthermore, in the description below, similar components are denoted by the same reference numerals throughout the drawings, and duplicate descriptions are omitted.

FIG. 1 is a diagram showing a configuration of a battery charge and discharge control system 10 including a battery charge and discharge control apparatus 30. The battery charge and discharge control system 10 performs charge and discharge control between a battery assembly 50 that is an assembly of a plurality of batteries, and a load or power source in an exterior 20 via the battery charge and discharge control apparatus 30 according to the status of the load or power source.

The battery assembly 50 has a desired power storage capacity obtained by combining a large number of unit batteries that are lithium ion batteries. The battery assembly 50 has a hierarchical structure, and one battery assembly is formed of eight unit groups 52 each formed of five battery units 54 Thus, the total number of battery units 54 is 40. One battery unit 54 is formed of 20 battery packs 56. Hence, the total number of battery packs 56 is 800. Furthermore, one battery pack 56 is configured such that a predetermined number of unit batteries are connected together in series-parallel combination. FIG. 1 does not show any unit batteries.

FIG. 1 shows the configuration of one battery unit 54 in detail. The one battery unit 54 is formed by connecting a predetermined number of battery packs 56 together in series to form a battery pack array and connecting a predetermined number of battery pack arrays together in parallel. In the example illustrated in FIG. 1, the one battery unit 54 is formed by connecting five battery packs 56 together in series to form one battery pack array and connecting four battery pack arrays together in parallel. That is, the one battery unit 54 is formed of 20 battery packs 56. Inside the battery pack 56, a plurality of battery units are connected together in parallel, and a plurality of sets of the battery units connected together in parallel are connected together in series.

A current detector 60 in FIG. 1 is pack current detection means for detecting a current in each of the battery pack arrays in the battery unit 54. Furthermore, a voltage detector 62 is cell voltage detection means for detecting the voltage between the terminals of each set of a plurality of unit batteries connected together inside the battery pack. These detection data are used to calculate the SOC of the unit battery, the battery pack 56, the battery unit 54, and the unit group 52. Additionally, an appropriate number of temperature detectors 64 are provided in each of the battery packs 56 and serve as pack temperature detection means for detecting the temperature of each battery pack 56.

A sub controller 38 provided in each of the battery units 54 is connected to the voltage detector 62, the current detector 60, the temperature detector 64, and the like, and serves as a data control apparatus with a function to acquire detection data in order to, for example, calculate the SOC and to transmit the detection data, for each battery unit 54, to the battery charge and discharge control apparatus 30 via a connection 44 denoted by HUB.

A switch board 40 is a board on which switches each provided for a corresponding one of the battery packs in the battery unit 54 are mounted. Each of the switches operates under the control of the sub controller 38 so as to connect or disconnect a power converter 36 described below and corresponding to the battery unit 54 to or from each of the battery pack arrays. This enables, for example, an operation of disconnecting a battery pack array including any defective battery pack 56 from the power converter 36.

The hierarchical structure of the battery assembly 50 has been described. The power converter 36 shown in FIG. 1 is a converter such as a bidirectional AC/DC converter or a bidirectional DC/DC converter having a function to convert power between the power source in the exterior 20 and the battery assembly 50 and between the battery assembly 50 and the load in the exterior 20. Specifically, the type of the converter used is selected according to the contents of a conversion actually performed. For example, if the power source in the exterior 20 is an external commercial power source, an AC/DC converter that converts AC power into DC power is used as the power converter 36. If the power source in the exterior 20 is solar batteries, a DC/DC converter is used as the power converter 36. If the load in the exterior 20 is an AC load, a DC/AC converter is used as the power converter 36. If the load in the exterior 20 is a DC load, a DC/DC converter is used as the power converter 36.

In association with the eight unit groups 52 into which the battery assembly 50 is divided, eight power converters 36 are assigned to the respective unit groups 52 and connected together in parallel. That is, the charge and discharge between the exterior 20 and the battery assembly 50 are generally carried out, under single charge and discharge control, on eight battery arrays connected together in parallel and each including the power converter 36 and the unit group 52 connected together. Thus, the charge and discharge control is performed on the eight battery arrays connected together in parallel.

The battery charge and discharge control apparatus 30 controls the charge and discharge of the eight battery arrays, and includes a master controller 32 and a power converter management section 34. The master controller 32 has a function to transmit a charge or discharge instruction for each of the power converters 36 to the power converter management section 34 based on an entire charge or discharge control instruction received from an entire control section that controls the operation of an entire battery system (not shown in the drawings). The power converter management section 34 has a function to control the operation of each of the eight power converters 36 in accordance with a charge or discharge instruction from the master controller 32, to charge or discharge the eight battery array groups.

The master controller 32 includes an instruction acquisition section acquiring an entire charge or discharge instruction intended for the entire battery array group, a start processing section starting charging or discharging of each of the battery arrays at a uniform charge or discharge power value obtained by dividing an entire charge or discharge power value contained in the acquired entire charge or discharge instruction by the number of the battery arrays, a comparison section acquiring the charge or discharge status of each of the battery arrays after the beginning of the charge or discharge and comparing the charge or discharge status with a predetermined charge or discharge set value for the entire battery array group, and a change process section changing the charge or discharge power value of each of the battery arrays based on the result of the comparison. The master controller 32 further includes a mode selection section having a plurality of predetermined change process modes for the change process and selecting one of the plurality of change process modes based on a predetermined selection criterion.

The master controller 32 may be formed of an appropriate computer, and the above-described functions may be implemented by executing software. Specifically, the functions may be implemented by executing a battery charge and discharge control program. Alternatively, some of the functions may be implemented by hardware. For example, the above-described instruction acquiring section, start processing section, comparison section, change process section, and mode selection section may be implemented either by software or by hardware.

The functions of the master controller 32 will be specifically described. The instruction acquiring section has a function to receive one entire charge or discharge control instruction from an entire control section (not shown in the drawings). The entire charge or discharge instruction is a single instruction for the entire battery assembly 50 indicating that, for example, "the batteries are to be charged at 240 kW with the SOC target value set to 800." Of course, the numbers are for description and may be different values.

Here, the SOC is a representation, in terms of percentage, of the SOC (state of charge) of each state of power storage based on an SOC (state of charge) of 100 corresponding to the state in which power is stored in the batteries to maximum. The above-described SOC target value may be set so as to prevent the battery assembly 50 from being excessively discharged or charged and to extend the lives of the batteries. For example, an SOC of 90% does not correspond to overcharge but leads to significant degradation, and thus, for example, an SOC of 80% may be specified as the upper limit of charge. For a charge instruction, the SOC target value may be the SOC value corresponding to the upper limit of charge. For a discharge instruction, the SOC target value may be the SOC value corresponding to the lower limit of discharge.

As described above, charge and discharge are performed on every eight unit groups 52. Thus, the SOC target value as described herein refers to the upper limit value or lower limit value of SOC of each unit group 52. Since each unit group 52 is formed of the plurality of battery units 54, the SOC of each unit group 52 may be the average of the SOC values of the plurality of battery units 54 when top priority is given to the required charge amount, or may be the maximum value or minimum value of the SOC values of the plurality of battery units 54 when safety against overcharge or overdischarge is taken into account.

The target value of the entire charge or discharge instruction may be any value other than the SOC target value. For example, the target value may be a power storage capacity value corresponding to the amount of power stored in the entire battery assembly 50. Alternatively, the target value may be a battery open voltage. In the example illustrated in FIG. 1, the target value may be an output voltage from the battery unit 54. Alternatively, in terms of monitoring of safety of the battery assembly 50, the target value may be an output current from the batteries, the temperature of the batteries, or the like.

The functions of the master controller 32 will be described again. The start processing section has a function to divide the entire charge or discharge instruction into individual instruction values for the eight power converters 36 and to transmit the individual instruction values to the power converter management section 34, which thus starts charging or discharging each battery array. The individual instruction value as described herein refers to a uniform charge or discharge power value obtained by dividing a charge and discharge power value contained in the entire charge or discharge instruction value, by 8. In the above-described example, 30 kW, obtained by dividing 240 kW by the number of the arrays, 8, is used and the following content is transmitted to the power converter management section: "The power converter 36 No. 1 charges the battery arrays at 30 kW, the power converter 36 No. 2 charges the battery arrays at 30 kW, . . . , the power converter 36 No. 8 charges the battery arrays at 30 kW."

The comparison section has a function to receive the state data about each of the battery units 54 from the corresponding sub controller 38 via the connection 44 immediately after the beginning of charge or discharge and to acquire the SOC of each battery array; that is, the SOC of each unit group 52 to compare the SOC with the SOC target value.

The change process section has a function to change the charge or discharge state from the uniform charge or discharge power value as needed based on the comparison between the SOC of each unit group and the SOC target value. Here, the change process section has three change process modes, and selects one of the three change process modes to carry out actual change processing. The change process mode may be pre-selected by a user or a selection criterion may be pre-specified so as to enable automatic selection based on the selection criterion.

As an example of the selection criterion, which one of the three change processing is selected during comparison of the SOC by the comparison section is determined based on the magnitude of a deviation from the target SOC. Furthermore, the three change process modes vary in the time until the charge or discharge control is completed, and thus which one of the three change process modes is selected may be determined based on the elapsed time from the beginning of the charge or discharge.

The contents of each of the three change process modes will be described below with reference to FIG. 2 to FIG. 16. As described above, the charge or discharge set value may be other than the SOC target value. The description below assumes that the entire charge or discharge instruction for the battery assembly 50 indicates that "the batteries are to be charged at 240 kW with the SOC target value set to 80%." In the charge instruction, the SOC target value is the upper limit value of charge, and thus the battery arrays are charged so as to meet the SOC target value. If the entire charge or discharge instruction is for discharge, the SOC target value is set to the lower limit value of discharge, and thus the battery arrays are discharged so as to meet the SOC target value. The discharge can be achieved similarly to the charge by replacing charge power described below with discharge power.

Figure 2:
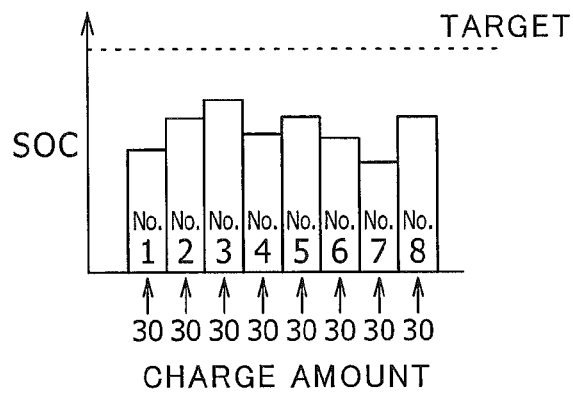
FIG. 2 is a diagram illustrating an initial SOC in the case of charge control in a mode 1 according to the embodiment of the present invention.
Figure 3:
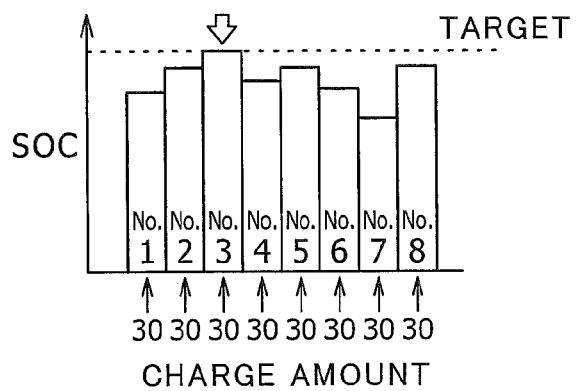
FIG. 3 is a diagram illustrating that one of the battery arrays has reached a target SOC as a result of uniform charge of the battery arrays following the state illustrated in FIG. 2.
Figure 4:
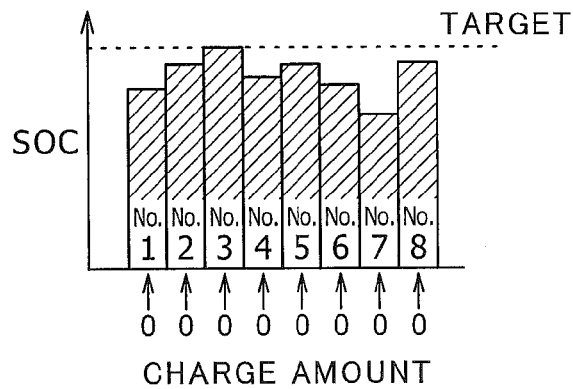
FIG. 4 is a diagram illustrating that the charge control in the mode 1 has ended.

FIG. 2 to FIG. 4 illustrate a first change process mode (mode 1), FIG. 5 to FIG. 10 illustrate a second change process mode (mode 2), and FIG. 11 to FIG. 16 illustrate a third change process mode (mode 3). In each of these figures, the x axis indicates the eight battery arrays, and the y axis indicates the SOC. To distinguish the eight battery arrays from one another, the eight power converters 36 No. 1 to No. 8 described with reference to FIG. 1 are used. Numbers shown below the x axis in association with the battery arrays are indicative of charge amounts; that is, charge or discharge instruction values.

The first change process mode will be described with reference to FIG. 2 to FIG. 4. FIG. 2 shows that the start processing section of the master controller 32 has functioned to specify a uniform charge power value=(240 kW/8)=30 kW for each of the battery arrays as a charge power. At the beginning of charge, the battery arrays have different SOC values. The battery arrays ideally exhibiting exactly the same performance and usage history have the same SOC. However, in actuality, the battery arrays may undergo repairs, replacement, and the like and exhibits different levels of performance and usage histories. Thus, the battery arrays have different SOC values as shown in FIG. 2.

FIG. 3 shows that after supply of uniform charge power of the same value to the battery arrays, first, the SOC of the battery array No. 3 has reached the target value. In this manner, the target SOC and the SOC of each of the battery array are compared by the function of the comparison section of the master controller 32. The comparison may be carried out at a predetermined sampling period or when the SOC value of the battery array reaches a threshold set equal to the target SOC.

In the first change process mode, as shown in FIG. 3, processing is carried out such that when one of the eight battery arrays reaches the target SOC, which corresponds to a charge set value, the charge of each of the eight battery arrays is stopped. Also when at least two battery arrays simultaneously reach the target SOC, the charge of each of the eight battery arrays is similarly stopped. Namely, when any one of the battery arrays reaches the target SOC earliest, the charge of all the battery arrays is stopped. In this sense, the first change process mode may be referred to as an all charge stop mode. For the discharge instruction, the first change process mode may be referred to as an all discharge stop mode.

With the first change process mode selected, when one of the battery arrays reaches the target SOC, which corresponds to the charge set value, the change process section of the master controller 32 carries out, in accordance with the contents of the all charge stop mode, a process of stopping charging all of the eight battery arrays. FIG. 4 illustrates this state and shows that the charge power value for all of the eight battery arrays is zero. The shaded area in FIG. 4 shows the battery arrays with charge stopped.

According to the first change process mode, the charge and discharge control ends when one of the battery arrays first reaches the target SOC. Thus, the charge and discharge control is completed in a short period of time. On the other hand, since the seven battery arrays have not reached the target SOC as shown in FIG. 4, the degree of charge in the entire battery assembly 50 is insufficient.

Figure 5:
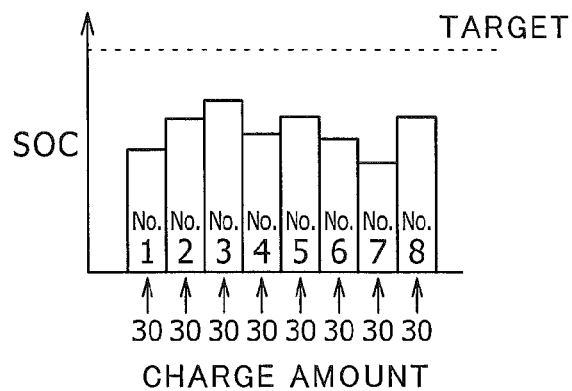
FIG. 5 is a diagram illustrating an initial SOC in the case of charge control in a mode 2 according to the embodiment of the present invention.
Figure 6:
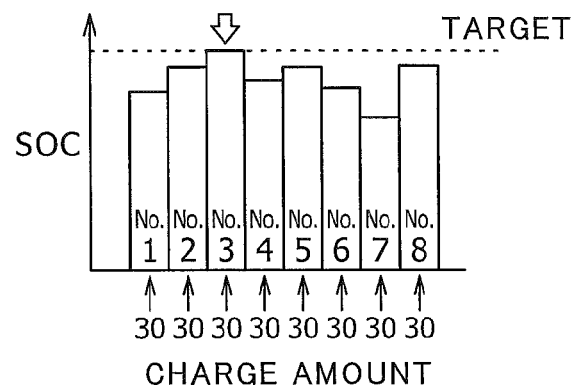
FIG. 6 is a diagram illustrating that one of the battery arrays has reached a target SOC as a result of uniform charge of the battery arrays following the state illustrated in FIG. 5.

Now, the second change process mode will be described with reference to FIG. 5 to FIG. 10. FIG. 5 illustrates the same contents as those of FIG. 2 and shows that the start processing section of the master controller 32 has functioned to specify the uniform charge power value=(240 kW/8)=30 kW for each of the battery arrays as a charge current. FIG. 6 illustrates the same contents as those of FIG. 3 and shows that after supply of uniform charge power of the same value to the battery arrays, first, the SOC of the battery array No. 3 has reached the target value.

In the second change process mode, as shown in FIG. 6, processing is carried out such that when one of the eight battery arrays reaches the target SOC, which corresponds to the charge set value, the charge of the battery array No. 3 having reached the target SOC is stopped, whereas the seven battery arrays having not reached the target SOC are continuously charged at the same uniform charge power value=30 kW. If at least two battery arrays simultaneously reach the target SOC, the charge of all the battery arrays having reached the target SOC is stopped, whereas the remaining battery arrays having not reached the target SOC are continuously charged at the same uniform charge power value. In this sense, the second change process mode may be referred to as a target reach charge stop mode. For the discharge instruction, the second change process mode may be referred to as a target reach discharge stop mode.

Figure 7:
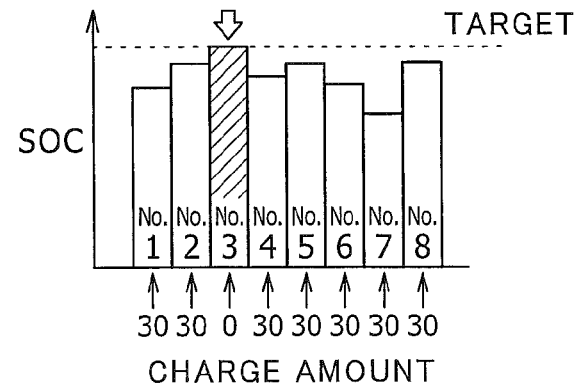
FIG. 7 is a diagram illustrating that in the state illustrated in FIG. 6, the charge of the battery array having reached the target SOC is stopped, with the other battery arrays continuously charged.

With the second change process mode selected, when any battery array reaches the target SOC, which corresponds to the charge set value, the change process section of the master controller 32 carries out, in accordance with the contents of the target reach charge stop mode, a process of stopping charging this battery arrays, whereas the battery arrays having not reached the target SOC are continuously charged at the same uniform charge power value. FIG. 7 illustrates this state and shows that the charge power value for the battery array No. 3 is zero, whereas the charge power value for the other battery arrays remains 30 kW. The shaded area in FIG. 7 shows the battery arrays with charge stopped.

Figure 8:
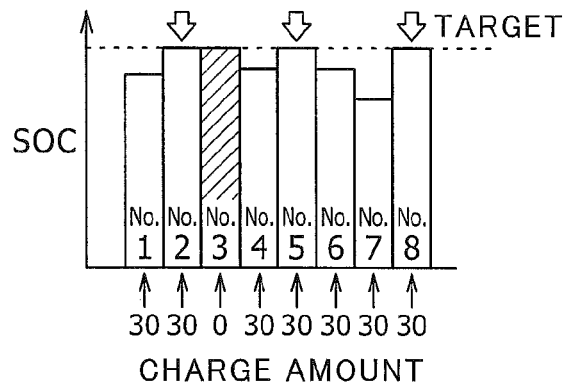
FIG. 8 is a diagram illustrating a state following that illustrated in FIG. 7 and showing that other ones of the battery arrays has reached the target SOC.
Figure 9:
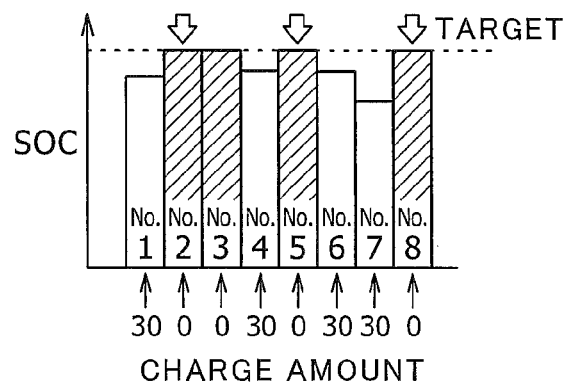
FIG. 9 is a diagram illustrating that in the state illustrated in FIG. 8, the charge of the battery array having newly reached the target SOC is stopped, with the remaining battery arrays continuously charged.

FIG. 8 is a diagram showing that continued charge following the state illustrated in FIG. 7 has allowed the battery arrays No. 2, No. 5, and No. 8 to reach the target SOC. Also in this case, in the second change process mode, when any battery array reaches the target SOC, which corresponds to the charge set value, there is carried out a process which stops charging these battery arrays, whereas the battery arrays having not reached the target SOC are continuously charged at the same uniform charge power value. FIG. 9 illustrates this state and shows that the charge of the battery arrays No. 2, No. 5, and No. 8 is newly stopped, with the remaining battery arrays No. 1, No. 4, No. 6, and No. 7 continuously charged at 30 kW.

Figure 10:
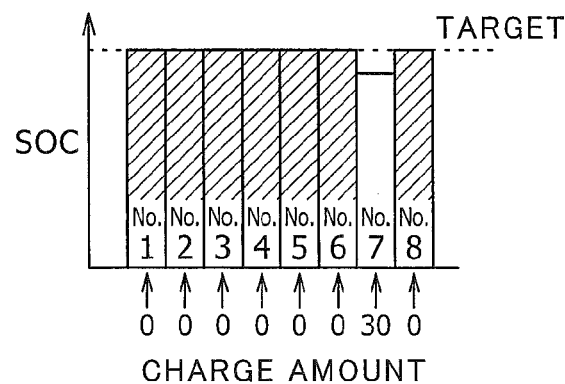
FIG. 10 is a diagram illustrating that all the other battery arrays but one have reached the target SOC.

The above-described processing is repeated. FIG. 10 shows that only the battery array No. 7 has not reached the target SOC, whereas the seven other battery arrays have reached the target SOC. Even in this case, the battery array No. 7, which has not reached the target SOC, is continuously charged at 30 kW, and thus all the battery arrays eventually reach the target SOC. At that time, the charge control of the entire battery assembly 50 ends.

According to the second change process mode, the battery arrays are continuously charged until each of the battery arrays reaches the target SOC. Thus, all the battery arrays can reach the target SOC, and the entire battery assembly 50 has a sufficient degree of charge. At this time, the charge of each battery array is stopped when the battery array reaches the target SOC, preventing possible overcharge. On the other hand, this processing requires time for the charge control. As described above, the second change process mode takes time but enables the degree of charge in the entire battery assembly 50 to be set to a sufficient value. If the charge or discharge process requires an extremely long time, the second change process mode may be switched to the first process mode using a threshold time or the like.

Figure 11:
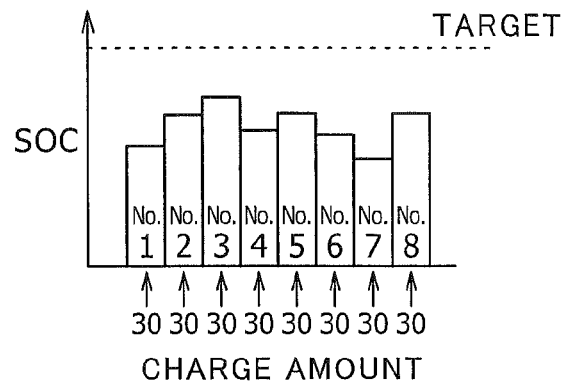
FIG. 11 is a diagram illustrating an initial SOC in the case of charge control in a mode 3 according to the embodiment of the present invention.
Figure 12:
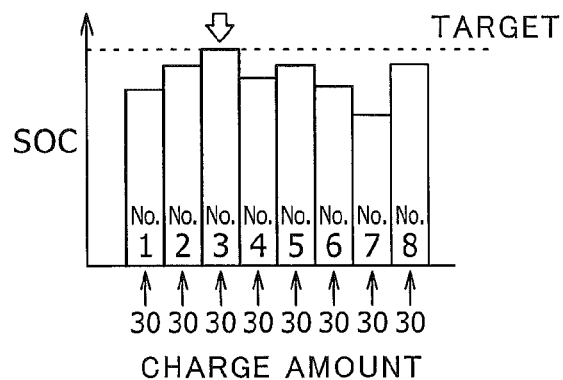
FIG. 12 is a diagram illustrating that one of the battery arrays has reached the target SOC as a result of uniform charge of the battery arrays following the state illustrated in FIG. 11.

Now, the third change process mode will be described with reference to FIG. 11 to FIG. 16. FIG. 11 illustrates the same contents as those of FIG. 2 and FIG. 5 and shows that the start processing section of the master controller 32 has functioned to specify the uniform charge power value=(240 kW/8)=30 kW for each of the battery arrays as a charge current. FIG. 12 illustrates the same contents as those of FIG. 3 and FIG. 6 and shows that after supply of uniform charge power of the same value to the battery arrays, first, the SOC of the battery array No. 3 has reached the target value.

In the third change process mode, processing is carried out such that when one of the eight battery arrays reaches the target SOC, the charge or discharge of the battery array having reached the target SOC is stopped, whereas the battery arrays having not reached the target SOC are continuously charged at a charge promotion power value based on a value obtained by dividing the entire charge power value by the number of the battery arrays having not reached the target SOC. If at least two battery arrays simultaneously reach the target SOC, the charge of all the battery arrays having reached the target SOC is stopped, whereas the remaining battery arrays having not reached the target SOC are continuously charged at the charge promotion power value. That is, the battery arrays are kept charged or discharged at the specified power value for as long a time as possible. In this sense, the third change process mode may be referred to as a total power value keeping process mode.

The charge promotion power value does not necessarily match the (entire charge power value/the number of battery arrays having not reached the target SOC), because a decrease in the number of the battery arrays having not reached the target SOC increases the (entire charge power value/the number of battery arrays having not reached the target SOC) to a relatively large power value, which exceeds, for example, the rated value of power capacity of the power converter 36.

Figure 13:
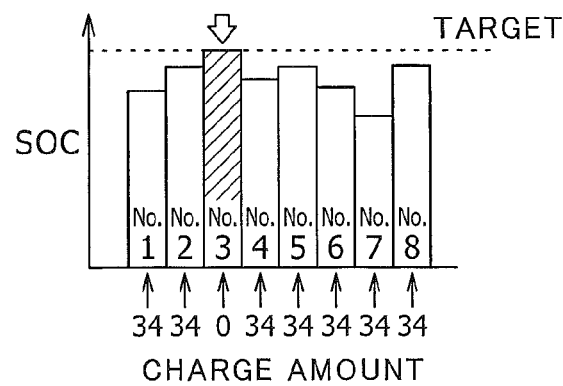
FIG. 13 is a diagram illustrating that in the state illustrated in FIG. 12, the charge of the battery array having reached the target SOC is stopped, with the other battery arrays continuously charged with the uniform charge power value changed so as not to exceed a total charge power value.

When the third change process mode is selected, the change process section of the master controller 32 carries out a process of stopping charging the battery array having reached the target SOC is stopped, while continuously charging the battery arrays having not reached the target SOC, at the charge or discharge promotion power value. FIG. 13 illustrates this state and shows that the charge power value=0 for the battery array No. 3, whereas the charge promotion power value=(240 kW/7)=34 kW for the other battery arrays. The shaded area in FIG. 13 shows the battery arrays with charge stopped.

Figure 14:
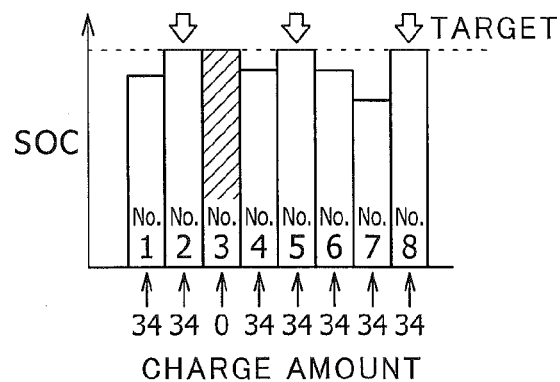
FIG. 14 is a diagram illustrating that other ones of the battery arrays has reached the target SOC after the state illustrated in FIG. 13.
Figure 15:
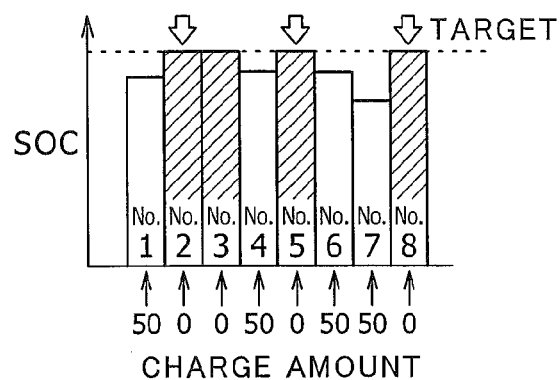
FIG. 15 is a diagram illustrating that in the state illustrated in FIG. 14, the charge of the array having newly reached the target SOC is stopped, with the remaining battery arrays continuously charged with the uniform charge power value further changed.

FIG. 14 is a diagram showing that continued charge following the state illustrated in FIG. 13 has allowed the battery arrays No. 2, No. 5, and No. 8 to reach the target SOC. Also in this case, in the third change process mode, when any of the battery arrays reaches the target SOC, which corresponds to the charge set value, there is carried out processing in which the charge of the battery array having reached the target SOC is stopped and in which the battery arrays having not reached the target SOC are continuously charged at a newly calculated charge promotion power value. FIG. 15 illustrates this state and shows that the charge of the battery arrays No. 2, No. 5, and No. 8 is newly stopped, whereas the remaining battery arrays No. 1, No. 4, No. 6, and No. 7 are continuously charged at the charge promotion power value=50 kW.

Here, since the number of the battery arrays having not reached the target SOC is four, the charge promotion power value is calculated to be (240 kW/4)=60 kW. However, if the rated value of the power converter 36 is 50 kW, the charge control is not allowed to exceed the rated value, and thus the upper limit of the charge promotion power value is specified as the rated value of the power converter 36. Thus, as shown in FIG. 15, the battery arrays No. 1, No. 4, No. 6, and No. 7 have a charge power value of 50 kW.

Figure 16:
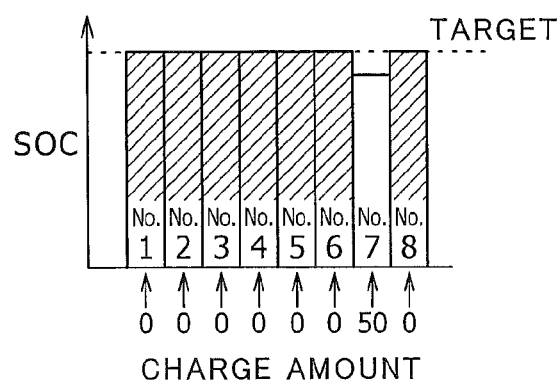
FIG. 16 is a diagram illustrating a state following that illustrated in FIG. 15 and showing that all the other battery arrays but one have reached the target SOC.

The above-described processing is repeated. FIG. 16 shows that only the battery array No. 7 has not reached the target SOC, whereas the seven other battery arrays have reached the target SOC. Even in this case, the battery array No. 7, which has not reached the target SOC, is continuously charged at the maximum rated value of 50 kW, and thus all the battery arrays eventually reach the target SOC. At that time, the charge control of the entire battery assembly 50 ends.

According to the third change process mode, the battery arrays are continuously charged until each of the battery arrays reaches the target SOC. Thus, all the battery arrays can reach the target SOC, and the entire battery assembly 50 has a sufficient degree of charge. In this regard, the third change process mode is similar to the second change process mode. However, in the third change process mode, the charge power value for the battery arrays having not reached the target SOC can be set larger than the uniform charge power value. Hence, the time for the charge control in the third change process mode is shorter than that in the second change process mode. In this case, the charge of each battery array is stopped when the battery array reaches the target SOC, preventing possible overcharge. Furthermore, the charge promotion power value is determined in view of restrictions on the upper limit associated with other factors such as the maximum rated value of the power converter 36, ensuring the safety of the battery charge and discharge control system 10. Additionally, the time for charge or discharge at a specified power value can be increased. On the other hand, the third change process mode requires a longer time for the charge control than the first change process mode, and imposes restrictions on the upper limit of the charge promotion power value. Consequently, toward the end of the charge and discharge control, the difference in processing time between the second change process mode and the third change process mode may be minimized.

As described above, the third change process mode takes time but enables the degree of charge in the entire battery assembly 50 to be set to a sufficient value. If the charge or discharge process requires an extremely long time, the third change process mode may be switched to the first process mode using a threshold time or the like, thus reducing processing time, or to the second process mode, thus reducing the entire charge power.

Figure 17:
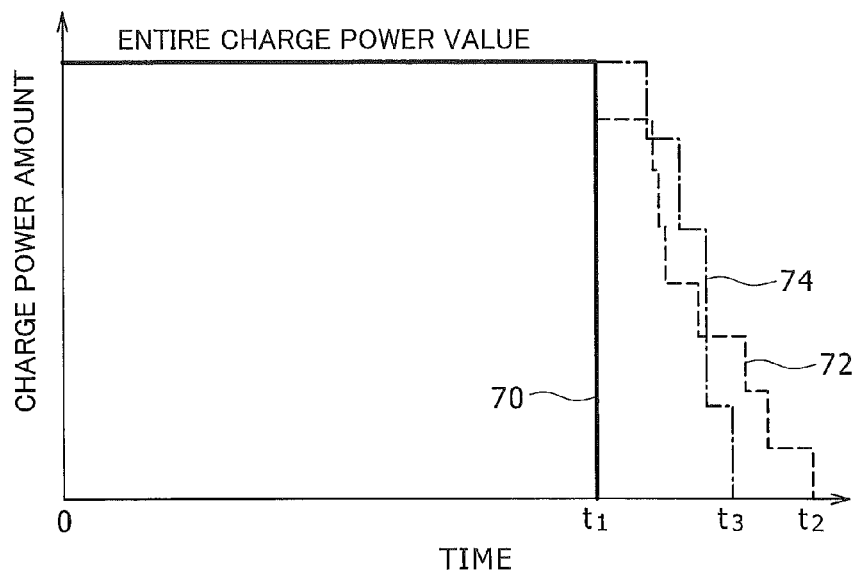
FIG. 17 is a diagram illustrating a comparison of a temporal variation in charge power value among three change process modes.
Figure 18:
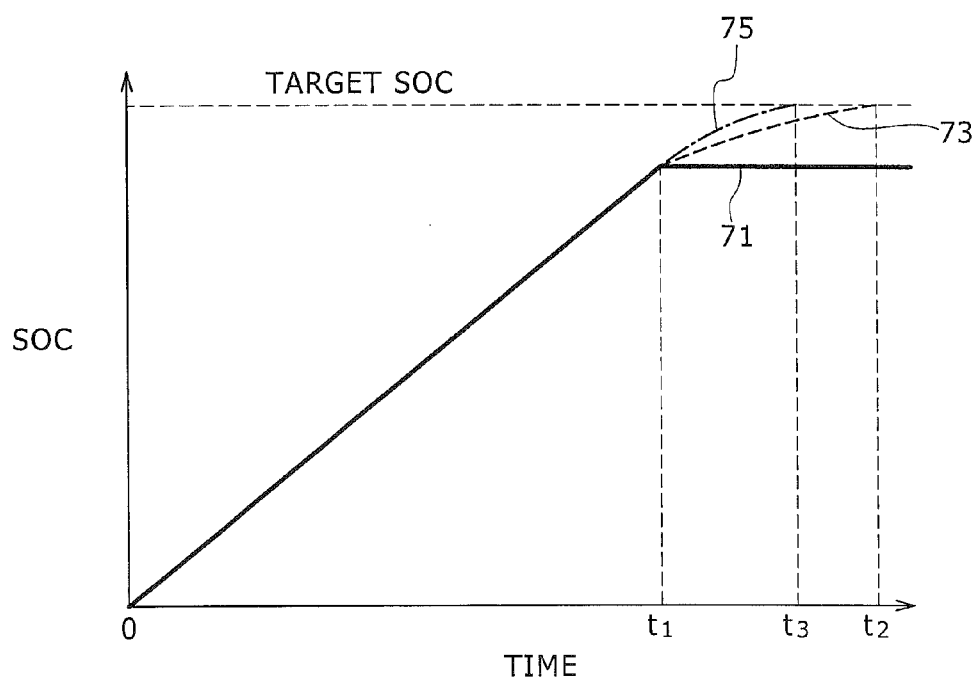
FIG. 18 is a diagram illustrating a comparison of a temporal variation in SOC among three change process modes.

FIG. 17 and FIG. 18 are diagrams illustrating a comparison of the three change process modes for charge control. The x axis in FIG. 17 and FIG. 18 indicates time, the y axis in FIG. 17 indicates the charge power value for the entire battery assembly 50, and the y axis in FIG. 18 indicates the SOC in the entire battery assembly 50. In FIG. 17 and FIG. 18, solid lines correspond to characteristic lines 70 and 71 for the first change process mode, dashed lines correspond to characteristic lines 72 and 73 for the second change process mode, and alternate long and short dash lines correspond to characteristic lines 74 and 75 for the third change process mode.

As shown in FIG. 17, the characteristic line 70 for the charge power value in the first change process mode indicates that between the beginning of charge and time $t_1$, the battery arrays are generally charged at a constant entire charge power value and that the charge process ends at time $t_1$. In contrast, the characteristic line 72 for the second change process mode and the characteristic line 74 for the third change process mode indicate that the battery arrays are generally charged at a constant entire charge power value and that after time $t_1$, the charge of the battery arrays is stopped in the order that the battery arrays reach the target SOC. Thus, the charge power value decreases in a stepwise fashion. In the second change process mode, the charge control ends at time $t_2$. In the third change process mode, the charge control ends at time $t_3$. Here, as the duration from the beginning of charge, the time $t_1$ is the shortest, the time $t_2$ is the longest, and the time $t_3$ is longer than the time $t_1$ and shorter than the time $t_2$.

As shown in FIG. 18, the characteristic line 71 for the SOC in the first change process mode indicates that the SOC starts from an initial value at the beginning of charge and increases as the time elapses and that when one of the battery arrays reaches the target SOC at time $t_1$, the charge control of the entire battery assembly 50 is stopped, thus preventing the SOC in the entire battery assembly 50 from reaching the target value. In contrast, the characteristic line 73 for the second change process mode and the characteristic line 75 for the third change process mode indicate the same characteristics as those of the characteristics line 71 for the first change process between the beginning of charge and time $t_1$ but indicate that the SOC in the entire battery assembly 50 increases even after time $t_1$ because the battery arrays having not reached the target SOC are continuously charged even after time $t_1$. Finally, in the second change process mode, the SOC in the entire battery assembly 50 reaches the target value at time $t_2$. In the third change process mode, the SOC in the entire battery assembly 50 reaches the target value at time $t_3$.

The embodiment has been described in conjunction with charge instructions. However, also for discharge instructions, change process modes with similar contents are used. As described above, the first to third change processes modes vary in charge and discharge processing time and in the degree of charge in the entire battery assembly 50, and may thus be selectively used according to the status of a charge or discharge request from the battery charge and discharge control system 10.

In the above description, one of the three change process modes is selected, and the change process is carried out in accordance with the selected mode. However, the change process may be carried out with the three change process modes preset to be fixed. In this case, the maser controller 32 carries out, for example, an all stop change process in accordance with a predetermined procedure for the change process. Alternatively, for example, a target reach charge or discharge stop change process may be carried out in accordance with a predetermined procedure for the change process. Alternatively, for example, a charge or discharge promotion change process is carried out in accordance with a predetermined procedure for the change process.

According to the embodiment of the present invention, the battery charge and discharge control apparatus starts charging or discharging each of the battery arrays at the uniform charge or discharge power value obtained by dividing the entire charge or discharge power value for the entire group of the battery arrays by the number of the battery arrays. Then, after the beginning of the charge or discharge, the battery charge and discharge control apparatus compares the charge or discharge status of each of the battery arrays with the predetermined charge or discharge set value. Based on the result of the comparison, the battery charge and discharge control apparatus changes the charge or discharge power value of each of the battery arrays. Thus, the appropriate charge and discharge control can be achieved so as to prevent each of the battery arrays from being excessively charged and discharged.

INDUSTRIAL APPLICABILITY

The battery charge and discharge control apparatus according to the present invention can be utilized for a battery charge and discharge control system with a plurality of arrays of batteries.

The invention claimed is:

1. A charge and discharge control apparatus performing charge and discharge control on a group of a predetermined number of battery arrays into which a battery assembly that is an assembly of a plurality of batteries is divided, the battery arrays being connected together in parallel, the apparatus comprising:
    an instruction acquisition section acquiring an entire charge or discharge instruction intended for the entire battery array group;
    a start processing section starting charging or discharging each of the battery arrays at a uniform charge or discharge power value obtained by dividing an entire charge or discharge power value contained in the acquired entire charge or discharge instruction by a number of the battery arrays;
    a comparison section acquiring a charge or discharge status of each of the battery arrays after the beginning of the charge or discharge and comparing the charge or discharge status with a predetermined charge or discharge set value for the entire battery array group; and
    a change process section changing the charge or discharge power value of each of the battery arrays based on a result of the comparison,
    wherein the change process section includes a mode selection section including a plurality of predetermined change process modes in which at least one of the charge or discharge process time and a degree of charge is different, and selecting one of the plurality of change process modes based on a predetermined selection criterion.

2. The battery charge and discharge control apparatus according to claim 1,
    wherein the mode selection section includes an all charge or discharge stop mode in which an all stop process of stopping charging or discharging each of the battery arrays is carried out when one of the plurality of battery arrays reaches the charge or discharge set value,
    wherein when the mode selection section selects the all charge or discharge stop mode, the change process section carries out, in accordance with the selected mode, a process of stopping charging or discharging all the battery arrays when one of the battery arrays reaches the charge or discharge set value.

3. The battery charge and discharge control apparatus according to claim 2,
    wherein the mode selection section includes a target reach charge or discharge stop mode in which when one of the battery arrays reaches the charge or discharge set value, charge or discharge of the battery array having reached the charge or discharge set value is stopped, whereas the battery arrays having not reached the charge or discharge set value are continuously charged or discharged at the same uniform charge or discharge power value, and wherein when the mode selection section selects the target reach charge or discharge stop mode, the change process section carries out, in accordance with the selected mode, a process of stopping the battery array having reached the charge or discharge set value, while continuously charging or discharging the battery arrays having not reached the charge or discharge set value, at the same uniform charge or discharge power value.

4. The battery charge and discharge control apparatus according to claim 3, wherein the selection section further includes a total power value keeping process mode in which when one of the battery array reaches the charge or discharge set value, charge or discharge of the battery array having reached the charge or discharge set value is stopped, whereas the battery arrays having not reached the charge or discharge set value are each continuously charged or discharged at a charge or discharge promotion power value based on a value obtained by dividing the entire charge or discharge power value by the number of the battery arrays having not reached the charge or discharge set value, and wherein when the selection section selects the total power value keeping mode, the change process section carries out, in accordance with the mode, a process of stopping the battery array having reached the charge or discharge set value, while continuously charging or discharging the battery arrays having not reached the charge or discharge set value, at the charge or discharge promotion power value.

5. The battery charge and discharge control apparatus according to claim 2, wherein the selection section includes a total power value keeping process mode in which when one of the battery arrays reaches the charge or discharge set value, charge or discharge of the battery array having reached the charge or discharge set value is stopped, whereas the battery arrays having not reached the charge or discharge set value are each continuously charged or discharged at a charge or discharge promotion power value based on a value obtained by dividing the entire charge or discharge power value by the number of the battery arrays having not reached the charge or discharge set value, and wherein when the selection section selects the total power value keeping mode, the change process section carries out, in accordance with the selected mode, a process of stopping the battery array having reached the charge or discharge set value, while continuously charging or discharging the battery arrays having not reached the charge or discharge set value, at the charge or discharge promotion power value.

6. A method of performing charge and discharge control on a group of a predetermined number of battery arrays into which a battery assembly that is an assembly of a plurality of batteries is divided, the battery arrays being connected together in parallel, the method comprising:

acquiring an entire charge or discharge instruction intended for the entire battery array group;

starting charging or discharging of each of the battery arrays at a uniform charge or discharge power value obtained by dividing an entire charge or discharge power value contained in the acquired entire charge or discharge instruction by a number of the battery arrays;

acquiring a charge or discharge status of each of the battery arrays after the beginning of the charge or discharge and comparing the charge or discharge status with a predetermined charge or discharge set value for the entire battery array group; and changing the charge or discharge power value of each of the battery arrays based on a result of the comparison, wherein, in the changing process, there are included a plurality of predetermined change process modes in which at least one of the charge or discharge process time and the degree of charge is different, and one of the plurality of change process modes is selected based on a predetermined selection criterion.

7. The method for controlling battery charge and discharge according to claim 6, wherein the plurality of change process modes include an all charge or discharge stop mode in which an all stop process of stopping charging or discharging each of the battery arrays is carried out when one of the plurality of battery arrays reaches the charge or discharge set value, wherein when the all charge or discharge stop mode is selected, in accordance with the selected mode, a process of stopping charging or discharging all the battery arrays is carried out when one of the battery arrays reaches the charge or discharge set value.

8. The method for controlling battery charge and discharge according to claim 7, wherein the plurality of change process modes include a target reach charge or discharge stop mode in which when one of the battery arrays reaches the charge or discharge set value, charge or discharge of the battery array having reached the charge or discharge set value is stopped, whereas the battery arrays having not reached the charge or discharge set value are continuously charged or discharged at the same uniform charge or discharge power value, and wherein when the target reach charge or discharge stop mode is selected, the method carries out, in accordance with the selected mode, a process of stopping the battery array having reached the charge or discharge set value, while continuously charging or discharging the battery arrays having not reached the charge or discharge set value, at the same uniform charge or discharge power value.

9. The method for controlling battery charge and discharge according to claim 8, wherein the plurality of change process modes include a total power value keeping process mode in which when one of the battery arrays reaches the charge or discharge set value, charge or discharge of the battery array having reached the charge or discharge set value is stopped, whereas the battery arrays having not reached the charge or discharge set value are each continuously charged or discharged at a charge or discharge promotion power value based on a value obtained by dividing the entire charge or discharge power value by the number of the battery arrays having not reached the charge or discharge set value, and wherein when the total power value keeping mode is selected, the method carries out, in accordance with the selected mode, a process of stopping the battery array having reached the charge or discharge set value, while continuously charging or discharging the battery arrays having not reached the charge or discharge set value, at the charge or discharge promotion power value.

10. The method for controlling battery charge and discharge according to claim 7,
wherein the plurality of change process modes include a total power value keeping process mode in which when one of the battery arrays reaches the charge or discharge set value, charge or discharge of the battery array having reached the charge or discharge set value is stopped, whereas the battery arrays having not reached the charge or discharge set value are each continuously charged or discharged at a charge or discharge promotion power value based on a value obtained by dividing the entire charge or discharge power value by the number of the battery arrays having not reached the charge or discharge set value, and
wherein when the total power value keeping mode is selected, the method carries out, in accordance with the selected mode, a process of stopping the battery array having reached the charge or discharge set value, while continuously charging or discharging the battery arrays having not reached the charge or discharge set value, at the charge or discharge promotion power value.

\* \* \* \* \*